July 12, 1966   O. C. NIEDERER ETAL   3,260,348
AUTOMATIC ROTARY EGG ARRANGING MEANS
Filed June 8, 1964   2 Sheets-Sheet 1
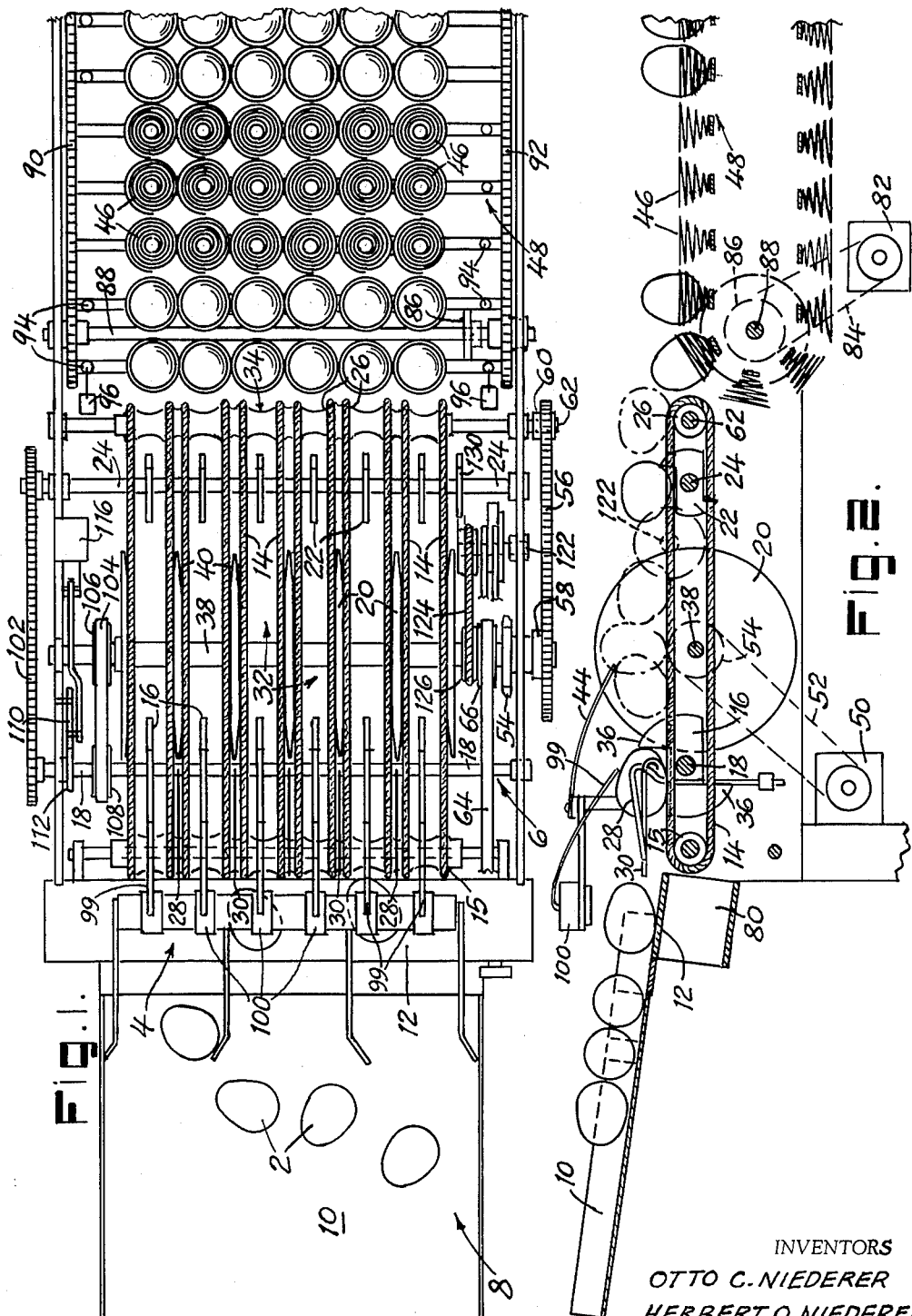
INVENTORS
OTTO C. NIEDERER
HERBERT O. NIEDERER
BY Albert Sperry
ATTORNEY

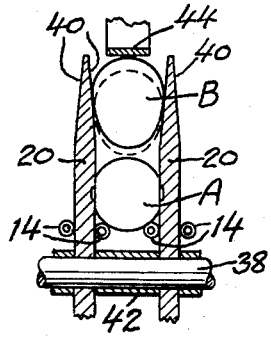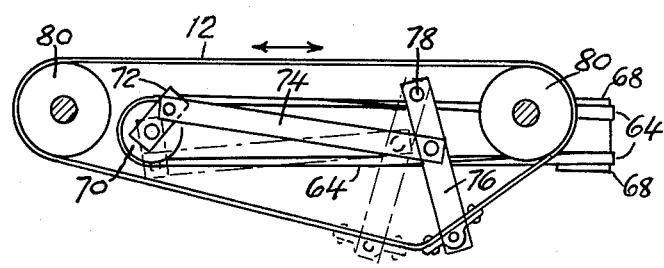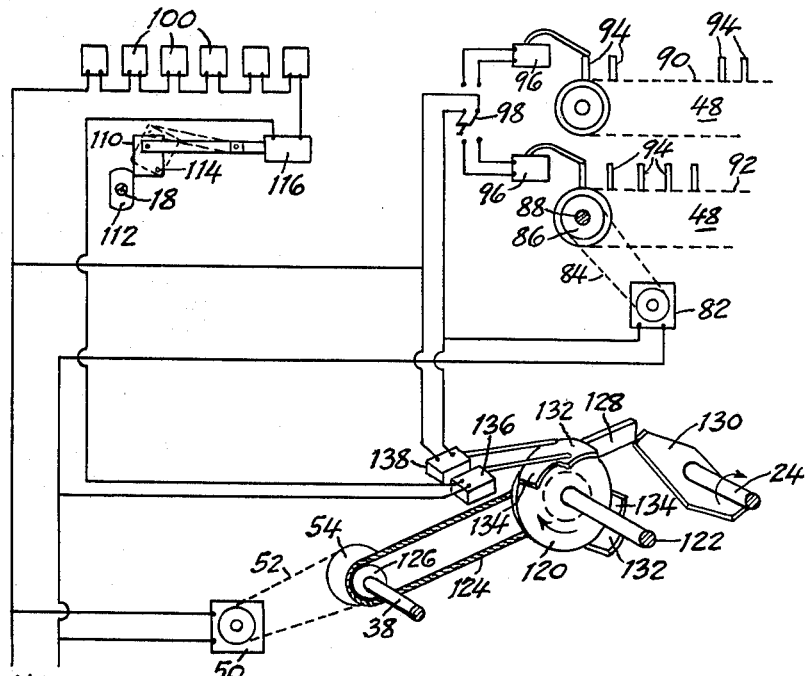

United States Patent Office 3,260,348
Patented July 12, 1966

3,260,348
AUTOMATIC ROTARY EGG ARRANGING MEANS
Otto C. Niederer, Bear Tavern Road, and Herbert O. Niederer, Church Road, both of Titusville, N.J.
Filed June 8, 1964, Ser. No. 373,495
9 Claims. (Cl. 198—33)

This invention relates to means for orienting and feeding eggs to a conveyor or other means with the larger ends of the eggs facing in the same direction.

There are many instances in the handling and feeding of eggs in which it is necessary or desirable to arrange the eggs so that the larger ends thereof face in the same direction. Typical of such equipment is the egg packing equipment of copending application Serial No. 338,192 wherein eggs are placed in cavities on a conveyor with the larger ends of the eggs downward and the smaller ends of the eggs facing upward. It is desirable to assure such positioning of the eggs rapidly and with certainty in order that a large volume of eggs can be handled by the equipment with a minimum of error and breakage.

In accordance with the present invention, this result is attained by passing the eggs to means which present surfaces spaced apart to engage the eggs at diametrically opposite points near the larger ends of the eggs so that the eggs may pivot about such points to assure the proper orientation and arrangement thereof. Elements may further be employed in combination with such orienting means for controlling the feed or movement of the eggs so as to assure the proper placement or delivery of the eggs, or predetermined groups of eggs, to a conveyor or other device.

Accordingly, the principal objects of the present invention are to orient and feed eggs rapidly and with certainty with the larger ends thereof facing in the same direction and to control the manner in which eggs are fed and arranged for delivery to egg packing or other egg handling equipment.

These and other objects and features of the present invention will appear from the following description thereof wherein reference is made to the figures of the accompanying drawings.

In the drawings:

FIG. 1 is a top plan view of typical equipment embodying the present invention;

FIG. 2 is a longitudinal sectional view of the construction shown in FIG. 1;

FIG. 3 is an enlarged sectional view through a portion of two of the egg orienting discs employed in the equipment illustrated in FIG. 1;

FIG. 4 is a diagrammatic illustration of a detail of the equipment shown in FIGS. 1 and 2; and FIG. 5 is a diagrammatic illustration of typical circuitry and elements which may be employed for controlling the equipment illustrated in FIGS. 1 and 2.

In that form of the invention chosen for purposes of illustration in the drawings, the eggs to be fed and oriented are shown at 2 and are supplied to the inlet and 4 of the egg feeding and arranging means indicated generally at 6. Egg supply means 8, such as the inclined tray 10 down which the eggs may roll, serve to direct eggs to the inlet end 4 of the orienting means. The lower end of the tray 10 is located adjacent one side of a reciprocating belt 12 which is movable back and forth transversely to the direction of inclination of the tray to move or spread the eggs on the tray sideways in the event they should accumulate adjacent one side of the tray or leave a portion of the tray empty while another portion of the tray has excess eggs thereon.

Egg moving strips or belts 14, which are preferably in the form of flexible, closely wound coiled spring members, pass about pulleys 15 adjacent the opposite side of the transversely reciprocating belt 12 in position to receive eggs from the reciprocating belt and advance them to rotatable stop means 16 carried by a shaft 18. The egg moving strips 14 are arranged in spaced parallel relation as shown in FIG. 1 and pass between and on opposite sides of egg orienting means shown as discs 20. The strips extend beyond the discs 20 and past supplemental stop means 22 on shaft 24 to the driving pulleys 26. Egg separating members 28 and 30 are located adjacent the transversely movable belt 20 and between the strips 14 in alignment with the planes in which the egg orienting discs 20 are located. The separating members thus cooperate with the strips 14 to define channels 32 along which the eggs are moved from the inlet end 4 to the delivery end 34 of the egg arranging means. As shown in FIGS. 1 and 2, the separating members 28 at one side of each channel 32 are preferably somewhat higher than the separating members 30 at the opposite side of each channel whereby the eggs on entering the channels 32 are turned into positions wherein their long axes extend lengthwise of the channels and parallel to the strips 14.

The eggs thus arranged are moved by the strips 14 along the channels 32 into positions wherein they engage the upwardly projecting lugs 36 of the rotatable stop means 16. Thereafter, when each of the channels 32 has an egg therein engaging the stop means, the latter are rotated to lower the projecting lug 36 of the stop means and allow a full set of eggs to be advanced by the strips 14 into the spaces between the egg orienting discs 20. These discs are carried by and rotatable with a shaft 38 and as shown in FIG. 3, the marginal portions of the discs are of less thickness than the central portions thereof so that the discs present inclined surfaces 40 sloping inwardly toward the channels 32 at a slight angle, say about 5 or 10 degrees. The leading ends of the eggs are thereby caused to pass between the discs 20 so as to engage the inclined surfaces 40 of the discs. Accordingly, the discs contact the opposite sides of the largest diameter portion of each egg so that the eggs are raised from the position A of FIG. 3 where they are supported by the strips 14 to the position B wherein they hang suspended between the discs. While thus suspended, the eggs automatically rotate under the action of gravity to positions in which their long axes are vertical and extend radially with respect to the axes of rotation of the discs. Further, as indicated in dotted lines in FIG. 3, the engagement and orientation of the eggs by the discs will be effected without reference to the size of the eggs being handled since smaller eggs will merely enter farther into the space between the discs 20 until the larger end thereof engages the inclined surfaces 40 of the discs. Moreover, if desired, the spacing of the discs 20 can be varied when necessary by the use of spacers 42 or other suitable means.

As shown in FIG. 2, the eggs when thus lifted and oriented have more nearly a line contact with the inclined surfaces 40 of the discs 20 so that they tend to remain in essentially radial positions with respect to the discs. As a result, when they are thereafter set down again on the channel forming strips 14, they are arranged with the larger ends of the eggs facing forward. It is generally desirable to provide an egg contacting member 44 such as the flexible strip of leather or the like which drags against the upper portion of each egg while it is suspended by the orienting discs 20 so that any tendency for the eggs to continue to rock or rotate as they are carried by the discs is overcome. In any event, the discs 20 operate to assure positioning of the larger ends of the eggs forward in the channel 32 as the eggs are lowered onto the strips 14 and moved on from the orienting discs to the supplemental stop means 22. When the supplemental stop means are thereafter actuated to release the eggs, the strips 14 will move the eggs large end foremost to the delivery end 34 of the egg arranging means 6. The properly arranged and oriented eggs may then be delivered to cavities or the egg receiving elements 46 of a conveyor 48 forming a part of egg packing equipment or to any other egg handling device desired.

In the construction illustrated, the egg moving means such as the strips or belts 14 and the egg orienting discs 20 are preferably driven continously and the transversely moving belt 12 may be continuously reciprocated. However, in order to assure the delivery and transfer of a full group or set of eggs to the egg receiving elements 46 of the conveyor 48, or to other egg handling means, the movement of the stop means 16 and the supplemental stop means 22 is preferably timed and coordinated with the movement of the conveyor 48. Interrupted movement of the stop means also serves to prevent crowding or engagement of succeeding eggs in the channels 32 as they pass to and from the egg orienting discs 20 whereby the eggs are individually handled by the orienting discs and are freely movable when raised and lowered thereby. Moreover, the eggs are not shifted about or displaced after they have been properly arranged and prior to their transfer to the conveyor 48.

The means employed for driving and controlling the movement of the various elements of the equipment can be selected and constructed in any suitable way. However, as shown in FIG. 5, the discs 20 are rotated by a motor 50 through a chain 52 and a sprocket 54 secured to the shaft 38. A chain 56 engaging the sprocket 58 on shaft 38 passes about the sprocket 60 secured to the shaft 62 by which the driving pulleys 26 for the strips 14 are actuated to move the strips to the right as seen in FIGS. 1 and 2 from the inlet end 4 to the delivery end 34 of the egg arranging means 6. At the same time, a drive belt 64 engaging a pulley 66, which is also secured to the shaft 38, extends about the horizontal positioned pulleys 68 adjacent the end of the egg arranging means 6 to a pulley 70 as shown in FIG. 4. The pulley 70 has a crank 72 rotatable therewith and connected by a link 74 to a rocker arm 76 pivotally mounted at 78. The transversely reciprocating belt 12 passes about the rollers 80 and has its ends connected to the free end of the rocker arm 76 so that as the pulley 70 is rotated by the drive belt 64, the crank 72 serves to move arm 76 back and forth and cause belt 12 to move back and forth transversely adjacent the inlet end 4 of the egg arranging means 6.

The conveyor 48 of the egg packing equipment, or other device to which the oriented eggs are to be transferred, is preferably driven by a separate motor as indicated at 82 in FIGS. 2 and 5. For this purpose, a chain 84 passes about a sprocket 86 secured to the shaft 88 by which the conveyor 48 is driven. The chains 90 and 92 at opposite sides of the conveyor 48 carry control pins 94. Since the packing equipment may be used to pack eggs in cartons of one dozen each containing two rows of six eggs each, the control pins 94 on chain 90 may be arranged in pairs as shown in FIG. 1 and as indicated diagrammatically in FIG. 5. However, the packing equipment may also be used to pack eggs in flats or the like containing thirty eggs arranged in five rows with six eggs in a row. Therefore, chain 92 may have control pins 94 carried thereby and arranged in groups of five as shown in FIGS. 1 and 5. A micro-switch 96 is located adjacent each of the chains 90 and 92 in position to be actuated by the control pins 94 and a switch 98 is provided to render one or the other (but not both) of the micro-switches 96 operative for controlling the operation of the motor 82 and conveyor 48. The control pins 94 can of course be otherwise spaced or arranged if desired and this will frequently be necessary when the conveyor 48 is employed as a part of other egg handling equipment with which the egg arranging and feeding means is used.

Further, in order to assure the discharge of a complete set of six eggs from the egg arranging means to the conveyor 48, or other egg handling means each time the later is prepared to receive the same, the egg arranging means 6 is provided with six channels 32 each of which has a stop means 16, a supplemental stop means 22 and a pair of spaced egg orienting discs 20 associated therewith. For the most satisfactory operation, both the stop means 16 in advance of the discs 20 and the supplemental stop means 22 at the rear of the discs are employed and means are provided for assuring the movement of six eggs simultaneously to the discs 20. For this purpose, a sensing element 99 connected to means such as a micro-switch 100 is located in each of the channels 32 adjacent each of stop means 16 and in position to be engaged and actuated when an egg engages the stop means. The micro-switches 100 are electrically connected in series so that current cannot pass therethrough until all of the micro-switches have been actuated and a full complement of eggs is in position to pass on to the egg orienting discs.

As shown in FIG. 2, the stop means 16, as well as the supplemental stop means 22, are in the form of rotatable members which are actuated intermittently and in unison by a chain 102 which passes about similar sprockets on the shafts 18 and 24 to which the stop means are secured. Each of the stop means 16 and 22 is provided with oppositely projecting egg engaging lugs 36 which when in their egg retarding position extend above the strips 14 upon which the eggs are supported in the channels 32. The strips 14 are driven continuously and, therefore, preferably present smooth surfaces so as to allow the eggs to remain in engagement with the lugs 36 while the strips 14 slide beneath the eggs without imposing excessive drag on the eggs or causing them to be displaced. However, when the stop means are rotated to move the lugs 36 downward below the strips 14, the strips will immediately advance the released eggs to the egg orienting discs 20.

The stop means are driven by means of a slip drive in the form of a leather, spring or other suitable belt 104 engaging a pulley 106 on the continuously rotating shaft 38 and a pulley 108 on the shaft 18 to which the stop means 16 are secured. The intermittent rotation of the stop means 16 and 22 is controlled by means of a latch member 110 engagable with a block 112 fixed to the shaft 18. The latch 110 is pivotally mounted at 114 and adapted to be actuated by a solenoid 116 electrically connected in series with the micro-switches 100. Therefore, the stop means 16 and 22 cannot be released for rotation until a full complement of eggs are present in the channels 32 and all of the micro-switches 100 are actuated to complete a circuit through the solenoid 116.

The operation of the stop means 16 and 22 further is controlled to coordinate the operation thereof with the operation of the conveyor 48 so as to insure the presence of the egg receiving cavities 46 of the conveyor 48 in position to receive eggs from the egg arranging means 6 when the eggs are transferred to the conveyor. Therefore, control elements such as those shown in FIG. 5 may be employed. As there shown, a plate 120 is mounted for rotation on a stub shaft 122 and is driven by a slip belt 124 from the pulley 126 on the continuously rotating shaft 38. Plate 120 has a lug 128 thereon engagable with a cam 130 on shaft 24 to prevent rotation of plate 120 until shaft 24 and the shaft 18 are rotated to release the eggs for movement upon disengagement of the latch 110 from the block 112 on shaft 18.

The plate 120 also has switch actuating elements 132 and 134 thereon positioned to control the operation of the switches 136 and 138 respectively. The switch 136 is held closed by the element 132 and is connected in series with the solenoid 116 and the micro-switches 100. Accordingly, when all of the micro-switches are closed by the movement of eggs into engagement therewith, the circuit including solenoid 116 will be completed to release the shafts 18 and 24 and the stop means 16 and 22 for rotation. The cam 130 on shaft 24 will then disengage lug 128 on the plate 120 allowing the plate to rotate. As plate 120 rotates, the element 132 will move out from beneath the actuating arm of switch 136 allowing the switch to open and break the circuit including solenoid 116. However, the shafts 18 and 24 will continue to rotate until the block 112 on shaft 18 again engages the latch 110, and the stop means 16 and 22, lugs 36 on the stop means 16 and supplemental stop means 22 are raised to their egg retarding positions and the lug 128 on the plate 120 again engages the cam 130 on the shaft 24.

The switch 138 has an actuating arm which engages the element 134 on plate 120 and serves to hold switch 138 open. The latter switch controls the flow of current to the conveyor driving motor 82 and the switch actuating element 134 is of such length that the motor circuit is held open until the eggs have been transferred from the egg arranging means to the cavities 46 in the conveyor 48. Thereafter, as the plate 126 continues to rotate, the element 134 passes beyond the actuating arm of swich 138 allowing the switch to close and causing the conveyor driving motor 82 to be energized. When the conveyor 48 is thus advanced, the pins 94 on the conveyor chains 90 and 92 will move out from beneath the contact arms of the micro-switches 96 to allow these switches to close and complete a holding circuit for maintaining the supply of current to the conveyor driving motor 82 until the next pin 94 engages the actuating arm of the active micro-switch 96 to break the circuit and stop the movement of the conveyor 48. Upon completion of a half rotation of the plate 126, the switch actuating element 134 will again engage the actuating arm of switch 138 to open the switch so that the conveyor motor will not again be energized until shaft 24 is again rotated in response to the presence of a complete set of eggs in the channels 32.

In using the construction thus described, the eggs to be oriented are supplied to the egg arranging means 6 from the tray 10 or other supply source, and are caused to enter the chanels 32. When each of the channels 32 has an egg therein, the micro-switches 100 will all be closed to complete a circuit through the solenoid 116 and control switch 136. The latch 110 will then be actuated by solenoid 116 to disengage the block 112 on shaft 18 whereupon shaft 18 and shaft 24 will be rotated one half revolution. Upon rotation of shaft 18, the lugs 36 on the stop means 16 will move downward below the egg supporting and moving strips to release the set of eggs previously retarded thereby for movement into the space between the egg orienting discs 20. The eggs are then raised and supported at diametrically opposite joints adjacent the larger ends thereof so as to rotate into substantially vertical positions. If desired, strips of leather or the like may engage the eggs while they are so supported to reduce the oscillation and prevent complete rotation thereof. As the orienting discs continue to rotate, the eggs are again lowered onto the egg moving strips 14, but they are now arranged so that the larger ends of all of the eggs face in the same direction.

The set of eggs thus arranged is then moved by the strips 14 to the supplemental stop means where they are held in readiness for transfer to the egg receiving cavities 46 of the conveyor 48 or to other equipment. Thereafter, when another set of eggs is supplied to the channels 32 to fill the same, the micro-switches 100 and solenoid 116 are again actuated to cause both the stop means 16 and the supplemental stop means 22 to rotate and release the sets of eggs previously held thereby. The set of eggs engaging the supplemental stop means 22 are then transferred to the conveyor 48 whereas the set of eggs which were previously held by the stop means 16 are passed to the orienting discs.

The operation of conveyor 48 is controlled by the element 134 on plate 120 to delay the advancing movement thereof until after the eggs from the supplemental stop means 22 have been deposited in the egg receiving cavities 46 in the conveyor 48. The conveyor then is caused to advance by operation of the motor 82 and it will continue to advance until one of the pins 94 on the conveyor chains 90 and 92 engages an active micro-switch 96 whereupon the conveyor 48 will be stopped in such a position that another row of egg receiving cavities 46 thereon will be located adjacent the delivery end 34 of the egg arranging means 6.

While the construction shown and described is particularly adapted for use with egg packing equipment, such as that shown in copending application Serial No. 338,192, the invention may be used in combination with various other types of equipment for supplying eggs to and receiving eggs from the egg arranging means. The various elements of the construction itself may also be changed and modified in their form, construction and arrangement in the combination. Thus for example in some instances, the supplemental stop means may be omitted, the diameter of the egg orienting discs may be varied, and the speed of movement and the timing of the operation of the various elements of the construction can be changed.

In view thereof, it should be understood that the particular embodiment of the invention shown in the drawings and described above is intended to be illustrative only and is not intended to limit the scope of the invention.

We claim:

1. Egg arranging means having an inlet end and a delivery end, elements defining a plurality of channels extending from the inlet end to the delivery end of the egg arranging means and including egg moving means for moving eggs along said channels, egg orienting means located adjacent said channels between the ends thereof and presenting egg engaging surfaces spaced apart a distance less than the diameter of the eggs to be arranged, said surfaces being inclined downwardly and inwardly on opposite sides of the channels, means associated with each of said channels and operable in response to the presence of an egg in each of said channels for controlling the movement of eggs through said channels, and means for moving at least a portion of said eggs orienting means upward and downward with respect to said egg moving means to raise eggs from the egg moving means and support them at opposite sides thereof while permitting the eggs to rotate between the inclined surfaces of the egg orienting means to positions wherein the long axes of the eggs extend vertically and thereafter to lower the eggs again onto said egg moving means.

2. Egg arranging means as defined in claim 1 wherein the egg orienting means are in the form of discs and are rotated to raise and lower eggs with respect to the egg moving means.

3. Egg arranging means having an inlet end and an outlet end, a plurality of egg guiding channels extending from the inlet end to the delivery end of the egg arranging means, a shaft extending transversely of said channels beneath the same and intermediate the ends thereof, egg orienting discs supported by said shaft and projecting upward between said channels at opposite sides thereof, said discs presenting surfaces inclined downwardly and inwardly at opposite sides of the channels and spaced apart distances less than the diameter of the eggs to be arranged, egg moving means in said channels for moving eggs from the inlet end of the egg arranging means into positions wherein the portions of the eggs which are of largest diameter engage the inclined surfaces of said egg orienting discs and for moving eggs from said egg orienting discs to the delivery end of the egg arranging means, means associated with each of said channels and operable in response to the presence of eggs in all of said channels for controlling the movement of eggs along said channels to said egg orienting discs, and means for rotating said discs to raise eggs from the egg moving means and allow the eggs to assume positions in which the long axes of the eggs extend radially with respect to the discs and thereafter to lower the eggs onto the egg moving means with the larger end of each egg facing toward the delivery end of the egg arranging means.

4. Egg arranging means as defined in claim 3 wherein stop means are located in said channels between the inlet end of the egg arranging means and the egg orienting discs and means responsive to the presence of a complete set of eggs, one in each channel, are operable to actuate the stop means to permit eggs to move further in said channels.

5. Egg arranging means as defined in claim 3 wherein stop means are located in said channels between the egg orienting discs and the delivery end of the egg arranging means, and means responsive to the presence of a complete set of eggs, one in each channel, are operable to actuate the stop means to permit eggs to move further in said channels.

6. Egg arranging means as defined in claim 3 wherein stop means are located in said channels, and means responsive to the presence of a complete set of eggs, one in each channel, are operable to actuate the stop means to permit eggs to move further in said channels.

7. The combination with egg arranging means as defined in claim 6 of a conveyor located adjacent the delivery end of said egg arranging means having transversely arranged rows of egg receiving cavities therein, and means for coordinating the operation of said stop means and conveyor to cause eggs to be transferred to each row of cavities in the conveyor with the larger ends of the eggs received in the cavities of the conveyor.

8. The combination with egg arranging means as defined in claim 6 of a conveyor having a conveyor located adjacent the delivery end of the egg arranging means, said conveyor having a plurality of transversely extending egg receiving cavities therein, a sensing element located in each channel responsive to the presence of an egg therein, said sensing elements being located adjacent said stop means and electrically connected in series to complete a circuit therethrough when eggs are present in all of said channels, means controlled by said circuit for initiating operation of said stop means to permit movement of eggs along said channels for transfer to said cavities in said conveyor, and additional means controlled by said circuit for advancing said conveyor in timed relation to the operation of the stop means.

9. The combination as defined in claim 8 wherein means are movable with the conveyor for interrupting movement of the conveyor when a row of cavities therein is in position to receive eggs from the egg arranging means.

References Cited by the Examiner

UNITED STATES PATENTS

| | | |
|---|---|---|
| 2,362,517 | 11/1944 | Woodberry. |
| 2,534,362 | 12/1950 | Magnuson. |
| 2,764,274 | 9/1956 | Griswold et al. _____ 198—30 |

EVON C. BLUNK, *Primary Examiner.*

SAMUEL F. COLEMAN, *Examiner.*

R. E. KRISHER, *Assistant Examiner.*